United States Patent [19]

Hendrix

[11] Patent Number: 4,609,459
[45] Date of Patent: Sep. 2, 1986

[54] FITTED FILTER MEMBER

[75] Inventor: Junior F. Hendrix, Houston, Tex.

[73] Assignee: Hendrix Steel & Fabricating Co. Inc., Houston, Tex.

[21] Appl. No.: 701,755

[22] Filed: Feb. 14, 1985

Related U.S. Application Data

[63] Continuation of Ser. No. 481,480, Apr. 1, 1983, abandoned.

[51] Int. Cl.⁴ .................................................. B01D 35/02
[52] U.S. Cl. ........................................ 210/91; 210/445; 210/447; 210/451; 210/497.01
[58] Field of Search .............. 210/232, 237, 238, 348, 210/445, 446, 447, 448, 450, 451, 452, 453, 456, 497.01, 473, 499, 91

[56] References Cited

U.S. PATENT DOCUMENTS

| | | | |
|---|---|---|---|
| 908,308 | 12/1908 | Mueller | 210/306 |
| 1,115,784 | 11/1914 | Cranwell et al. | 210/453 |
| 1,152,831 | 9/1915 | Monteagle | 210/443 |
| 1,961,498 | 6/1934 | Krueger | 210/165 |
| 2,017,350 | 10/1935 | Morgan | 210/166 |
| 2,162,043 | 6/1939 | Westlund et al. | 55/373 |
| 2,275,958 | 3/1942 | Hagel | 210/167 |
| 2,372,445 | 3/1945 | Morgan | 210/453 |
| 2,530,283 | 11/1950 | Brown | 210/164 |
| 2,915,188 | 12/1959 | Buker | 210/447 |
| 3,268,990 | 8/1966 | Adler | 29/163.5 R |
| 3,362,535 | 1/1968 | Kasten | 210/91 |
| 3,530,993 | 9/1970 | Fulton | 210/411 |
| 3,552,552 | 1/1971 | Johnson | 210/447 |
| 3,561,605 | 2/1971 | Likness | 210/497.1 |
| 3,735,874 | 5/1973 | Steinman | 210/430 |
| 3,834,539 | 9/1974 | Thompson | 210/167 |
| 4,009,109 | 2/1977 | Tullier et al. | 210/447 |
| 4,051,042 | 9/1977 | Tullier et al. | 210/409 |
| 4,124,511 | 11/1978 | Lay | 210/447 |

Primary Examiner—Richard V. Fisher
Assistant Examiner—Wanda L. Millard
Attorney, Agent, or Firm—Guy E. Matthews

[57] ABSTRACT

A filter apparatus having a hollow, T-shaped body, the upper portion of the "T" defining a fluid flow path and the lower portion of the "T" defining a filter housing portion. A baffle plate is positioned in the "T" to direct fluid into a filter element retained within the filter housing portion of the housing. A first end of the filter element extends into an aperture in the baffle plate and is retained thereby. A second end of the filter element is coupled to a base, a portion of which extends externally to the housing. The externally extending portion of the base may contain data regarding the filter element. An aligning pin and alignment tab for such externally extending portion of said base may be provided to facilitate assembly of the filter apparatus.

2 Claims, 3 Drawing Figures

FITTED FILTER MEMBER

BACKGROUND OF THE INVENTION

This is a continuation of application Ser. No. 481,480, filed Apr. 1, 1983, now abandoned.

This invention relates generally to filter apparatus and more specifically relates to improved flow line filter apparatus.

The use of filters located within flow line fittings in pipelines or conduits is known. An important and desirable feature of filters within flow line fittings is the facility of filter element replacement without the removal of the filter housing from the conduit flow path. Several difficulties have been presented by the use of prior art embodiments of filter apparatus however. Prior art designs, as typified by the apparatus described in U.S. Pat. No. 4,124,511, issued Nov. 7, 1978 to Lay, and U.S. Pat. No. 4,051,042, issued Sept. 27, 1977 to Tullier, et al., have utilized a T-shaped hollow body, the top portion of the "T" installed in the conduit flow path and the lower or upright portion of the "T" has housing the filter element. An inclined baffle plate having an aperture surrounded by a downwardly extending flange is utilized to direct the fluid flow from the flow path into the filter. The downwardly extending flange is utilized to maintain alignment between the baffle plate aperture and the filter element. The use of a downwardly extending flange fitting inside the filter element limits the diameter of aperture which may be used with a given size filter, thus placing a restriction on the flow of fluid through the filter apparatus. Further, the downward extent of the flange serves to further limit the effective size of the aperture to the fluid flow path, thereby again restricting the fluid flow. In addition to limiting the effective flow capacity through the filter apparatus and thus through the conduit system, these restrictions cause the buildup of differential pressure within the filter apparatus, such pressures focused upon the filter apparatus.

Another difficulty with prior art designs is that filter elements are often not truly interchangeable due to variations in dimensions resulting either from manufacturing tolerances or design considerations for particular applications. Therefore, to eliminate the necessity of removing a filter and dimensionally duplicating it at any time when the filter element is to be replaced, such duplication requiring a lengthy shutdown of the conduit system, some prior art systems have utilized some form of adjustable device, operating in conjunction with the aforementioned baffle plate flange, such device requiring adjustment for each individual filter, to correctly position such. Such a device is seen in the apparatus of Lay, U.S. Pat. No. 4,124,511, above.

Accordingly, the apparatus of the present invention presents a new apparatus for filtering the fluid flow while providing minimal restriction in the fluid flow path and whereby filter elements may be quickly interchanged, and whereby installed filter elements may be self-indicating of dimensions or other information pertinent to the filter apparatus.

SUMMARY OF THE INVENTION

A filter apparatus in accordance with the present invention has a hollow, T-shaped body, the upper portion of the "T" defining a fluid flow path and a lower portion of the "T" defining a filter housing portion. A baffle plate is positioned in the "T" at the intersection of the two portions of the "T" to intersect the fluid flow and to direct the fluid flow into a filter disposed within the lower portion of the "T." This baffle plate is preferably angularly disposed at approximately a 45 degree angle relative to an axial path through each portion of the "T." A filter element extends through the lower portion of the "T" and, at a first end, extends up into an aperture through the baffle plate, and is retained thereby. A second end of the filter element is coupled to a filter base, which contains a centrally located aperture, and has a tab portion which will extend externally to the housing. In a preferred embodiment, this base section is adapted to be compressed retained between a cover plate and flange at the bottom of the housing, thus retaining the filter element in a desired orientation relative to the housing. An indexing pin is provided to assist in achieving this initial alignment. Also, a pair of brackets or tabs may be included on the external portion of the housing to further index the base plate by reference to the externally extending portion thereof. The extending portion of the base may preferably be engraved or in some other way labeled with data regarding the filter element.

DETAILED DESCRIPTION OF A PREFERRED EMBODIMENT

Figure 1:
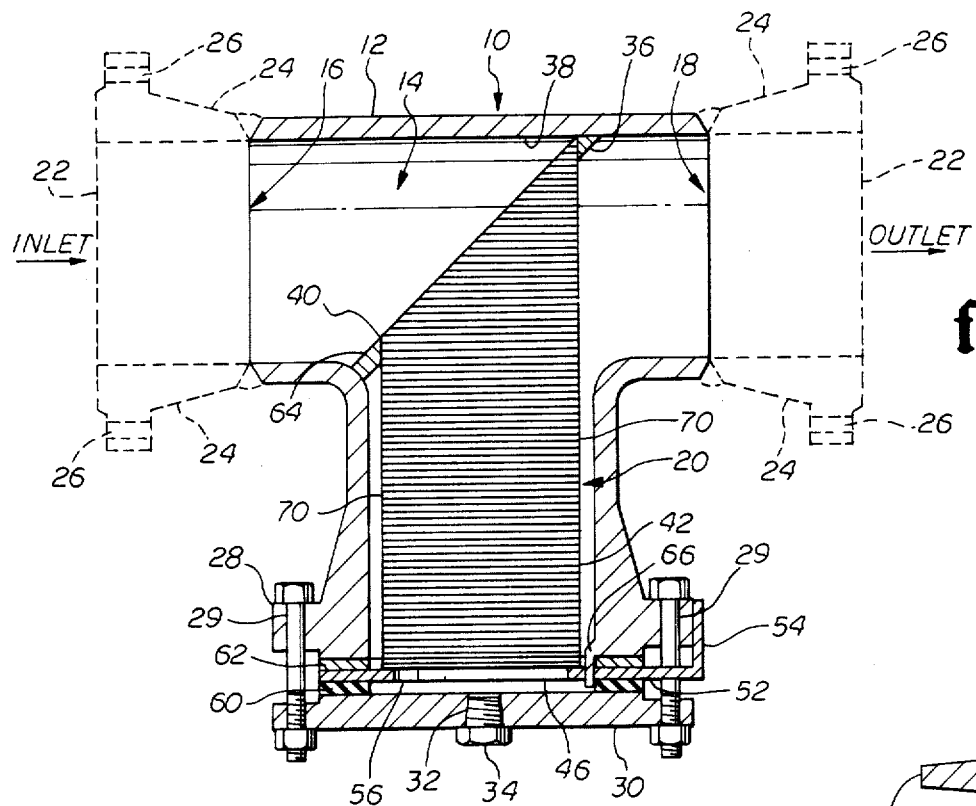
FIG. 1 is a side view, partially in vertical section, of a filter apparatus in accordance with the present invention.

Referring now to the drawings in more detail, and particularly to FIG. 1, therein is shown a filter apparatus 10 in accordance with the present invention, depicted partially in vertical section. Filter apparatus 10 includes housing 12 which is preferably of a form defining a generally straight flow path 14 between an inlet aperture 16 and an outlet aperture 18 and having a filter housing section 20 in approximately perpendicular relation to flow path 14. Such form defining, essentially, a hollow, T-shaped housing. In many applications it is desirable to have flanged connections at both inlet aperture 16 and outlet aperture 18 to facilitate the coupling of housing 12 into a conduit flow path. Optional flange connections 22 are depicted as separate members which may be coupled to housing 12 by suitable means such as welding. Flange connections 22 may also be formed as integral parts of housing 12. Optional flange connections 22 will typically have reinforced flanges 25 and bolt holes 26 in such flanges 25 whereby housing 12 may be installed in the conduit flow path by a plurality of circumferentially spaced bolts in a manner known to the art.

Housing 12 preferably has a peripheral flange 28 at the outer extension of filter housing section 20 such flange 28 containing a plurality of circumferentially spaced holes. A cover plate 30 is adapted to be boltably securable to flange 28 so as to form a sealable access to filter housing section 20. Cover plate 30 preferably contains a generally centrally located aperture 32 for housing a cooperatively engageable plug 34, the function of which will be discussed later herein.

Secured internal to housing 12, and in flow path 14, is baffle plate 36. Baffle plate 36 is preferably installed at approximately a 45 degree angle relative to straight, top surface 38 of housing 12. Baffle plate 36 contains an eliptical aperture 40 of such dimension as to cause aperture 40 to exhibit a generally circularly profiled opening to a flow path approximately 45 degrees offset from the plane of baffle plate 36. Accordingly, when baffle plate 36 is installed within body member 12 in the manner described earlier herein, aperture 36 presents a flow path 14 and a filter path 41 concentric to the respective inner surfaces of housing 12. A filter unit 42, preferably having a generally cylindrical exterior is disposed within filter path 41 and in filter housing section 20 of housing 12, a portion of filter element 44 of filter unit 42 extending upwardly into aperture 40.

Figure 2:
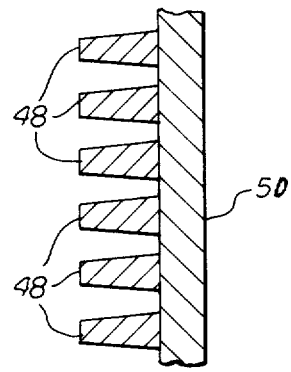
FIG. 2 is a cross-sectional view of a small portion of the filter element of the apparatus of FIG. 1.
Figure 3:
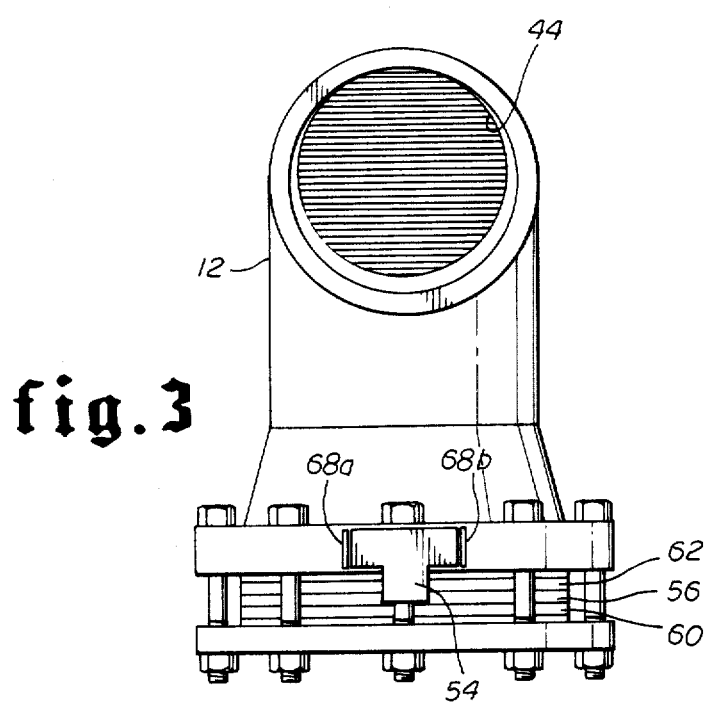
FIG. 3 is an external view, from the outlet end, of the filter apparatus of FIG. 1.

Referring now also to FIG. 2, therein is illustrated a portion of filter element 42 of FIG. 1. Filter unit 42 includes a filter element 44 secured to a filter base plate 46. Filter element 44 may preferably be constructed of various forms of self-supporting materials such as, for example, reinforced wire mesh or similar materials. However, in a particular preferred embodiment, filter element 44 will be formed of a material commonly known as wedge wire. This material includes wedge, or trapezoidally, shaped wire 48, as illustrated in FIG. 3, preferably welded or otherwise affixed to a plurality of support rods 50 situated generally perpendicular to wire lengths 48 such that, in a configuration as used in the present invention, a filter element 44 of a generally vertically rigid, obliquely truncated cylindrical form is constructed. Filter element 44 may be formed by one or more wire lengths 48 in a generally helical form and having support rods so as needed. However, again in a particular preferred embodiment, a plurality of trapezoidal wire lengths 48 will be formed, except in the truncated portion of filter element 44, into a plurality of longitudinally spaced and axially aligned rings of wire 48, such longitudinal spacing established by a plurality of vertically extending support rods 50 coupled in spaced relation to the inner periphery of the wire rings. In the truncated portion of filter element 44, wire lengths 48 will be of a similar form as that described above but will have a portion of the circular form removed to facilitate the desired truncation of filter element 44. These trapezoidally-shaped wire lengths 48 will have the broad or base part of the wedge extending to the interior of the truncated cylindrical form, toward the fluid flow, and the narrow or tip portions extending toward the exterior of the truncated cyclindrical form. It will be appreciated tht a filter element having either a helical construction as described above, or a plurality or rings construction will exhibit as cross section generally as shown in FIG. 2.

Filter base plate 46 includes a flat portion 52 and an upturned or tab portion 54. In a central area of flat portion 52 is aperture 56. Aperture 56 is of slightly less diameter than the inner diameter of filter element 44 to facilitate the securing of filter element 44 to base plate 46 by welding or other suitable means. Flat portion 52 of base plate 46 also includes alignment aperture 58, the function of which will be discussed later herein.

Referring now also to FIG. 3, therein is illustrated an external view of filter apparatus 10 of FIG. 1, shown from the outlet end thereof. When filter apparatus 10 is assembled, filter base plate 46 will be compressedly secured between cover plate 30 and peripheral flange 28 on housing 12. A pair of gaskets 60,62 are preferably distributed on either side of base plate 46 to provide optimal sealing between cover plate 30, base plate 46 and housing 12. Filter element 44 will extend up through aperture 40 in baffle plate 36 and will optimally be obliquely truncated so as to generally follow the plane of upper surface 64 of baffle plate 36. However, it is a feature of this invention that filter element 44 may terminate within the width of baffle plate 36 or may extend therethrough, in many cases as much as one-half to three-quarters of an inch, without significantly affecting the free flowing characteristics of filter apparatus 10. An aligning pin 66 affixed to housing 12 passes through alignment aperture 58 in filter base plate 56 to assure that filter element 44 is optimally aligned with housing 12, and thereby with baffle plate 36, thereby assuring optimal congruence between the upper plane of filter element 44 and that of baffle plate 36.

An additional aligning feature is found in upturned tab 54 of filter base plate 46. Tab 54 aligns between a pair of stubs or brackets 68a,68b on the exterior of housing 12. Brackets 68a,68b not only show alignment of filter unit 42 with housing 12 and therefore facilitate assembly thereof, but also protect tab 54 from being hit or damaged. Tab 54 is preferably engraved or in some other way labeled with pertinent dimensions or other information of filter unit 42. It is thus easy to verify any needed information about filter unit 42 when needed without directly inspecting filter unit 42 or relying upon bookkeeping records.

It is to be appreciated that the cooperatively engageable relation of aperture 40 and baffle plate 36 and filter element 44 serves not only to facilitate interchangeability of filter members 42 but also to optimize the flow area into, and therefore, through, filter element 44. Aperture 40 may extend very near the inner surfaces of housing 12 defining flow path 14, thereby assuring minimal restriction to fluid flow therethrough. Further, without the downwardly extending flange around such baffle plate aperture 40, as found in prior art systems, the fluid flow restriction is reduced and the flow path through filter element 42 is more direct and therefore more efficient.

Aperture 32 in cover plate 30, sealable by plug 34 is provided to facilitate cleaning of filter unit 42. When plug 34 is removed from cover plate 30, the fluid flow exiting aperture 32 will tend to dislodge particulate matter from filter element 44 and to remove particulate matter at the bottom of filter unit 32.

Many modifications and variations besides those specifically mentioned may be made in the techniques and structures described herein and depicted in the accompanying drawings without departing substantially from the concept of the present invention. Accordingly, it should be clearly understood that the forms of the invention described and illustrated are exemplary only and are not intended as limitations on the scope of the present invention.

The embodiments of the invention in which an exclusive property or privilege is claimed are defined as follows:

1. In filter apparatus, the combination comprising:
   (a) A generally T-shaped member with generally opposed flow inlet and flow outlet ends and a filter housing disposed perpendicular to said inlet and outlet ends which terminates into a connector flange having connection holes defined around the flange;

(b) A baffle plate mounted within said housing at an oblique angle relative to the flow path between said inlet end and said outlet end and defining an elliptical aperture which presents a flow path and a filter path concentric to the inner surface of said filter housing;

(c) A flanged cover plate connected to said connector flange by means of threaded connectors disposed in the holes provided around said flange and around said cover plate;

(d) A generally cylindrical filter means comprising, (1) a filter element fitted within said aperture and having an obliquely truncated first end defining a surface generally parallel to the plane of said baffle plate, and (2) a filter base plate forming a second end of said filter element and sized to be compressedly engaged between said flange and said cover plate;

(e) Said base plate having a flat portion extending outwardly to the periphery of said flange and then turned up to conform with the outside edge of said flange and fitted between two peripheral alignment means formed on the outside cylindrical face of said flange;

(f) Said flat portion defining a hole to receive one of said threaded connectors as located in a selected hole in said flange to rotationally orient said filter element with said baffle plate; and (g) Said turned up portion being designed to display visual information.

2. The combination of claim 1 wherein said filter base plate further has an indexing aperture cooperatively engageable with an index pin extending from said connector flange to index said cover plate hole with said selected hole in said connector flange.

* * * * *